United States Patent [19]

Babel et al.

[11] Patent Number: 5,401,573
[45] Date of Patent: Mar. 28, 1995

[54] PROTECTION OF THERMAL CONTROL COATINGS FROM ULTRAVIOLET RADIATION

[75] Inventors: Henry W. Babel, Huntington Beach, Calif.; Mark M. Hasegawa, Somerville, Mass.; Steven A. Daneman, Westminster, Calif.

[73] Assignee: McDonnell Douglas Corporation, Md.

[21] Appl. No.: 983,046

[22] Filed: Nov. 30, 1992

[51] Int. Cl.⁶ .............................................. B32B 17/06
[52] U.S. Cl. ................................. 428/336; 428/411.1; 428/428; 428/446; 428/447; 428/448; 428/469; 428/472; 428/472.2; 428/689; 428/697; 428/702
[58] Field of Search ............... 428/469, 472, 446, 447, 428/448, 450, 421, 428, 411.1, 689, 697, 702, 332, 334, 336, 472.2; 106/84, 292

[56] References Cited

U.S. PATENT DOCUMENTS

| | | | |
|---|---|---|---|
| 3,607,338 | 9/1971 | Webb | 106/292 |
| 3,620,791 | 11/1971 | Krupnick | 106/84 |
| 4,008,348 | 2/1977 | Slemp | 428/421 |
| 4,039,347 | 8/1977 | Fletcher | 106/292 |
| 4,093,771 | 6/1978 | Goldstein | 428/428 |
| 4,111,851 | 9/1978 | Shai | 106/84 |
| 4,347,284 | 8/1982 | Tsutomi | 428/697 |
| 4,381,333 | 4/1983 | Stewart | 428/428 |
| 4,397,716 | 8/1983 | Gilliland | 204/33 |
| 4,939,031 | 7/1990 | Torre | 428/421 |
| 4,980,206 | 12/1990 | Torre | 428/411.1 |

*Primary Examiner*—Archene Turner
*Assistant Examiner*—Timothy M. Speer
*Attorney, Agent, or Firm*—Max Geldin; John P. Scholl; Roger C. Turner

[57] ABSTRACT

A metal substrate such as aluminum or an alloy thereof having an ultraviolet sensitive thermal control coating on the substrate such as an anodic coating or a white thermal control paint coating, and an ultraviolet degradation protective coating on the thermal control coating. The ultraviolet degradation protective coating can be an ultraviolet absorber such as quartz or an ultraviolet reflector such as aluminum oxide.

12 Claims, No Drawings

PROTECTION OF THERMAL CONTROL COATINGS FROM ULTRAVIOLET RADIATION

BACKGROUND OF THE INVENTION

This invention relates to the protection of sensitive thermal control coating surfaces, and is specifically directed to the application of a protective coating over a thermal control coating to serve as a shield against degradation from ultraviolet (UV) radiation, particularly in a space environment.

Many materials are susceptible to degradation from ultraviolet radiation. This degradation is much more severe in space than on Earth where one has the beneficial screening effects of the atmosphere and cloud cover. Many of the materials used on earth, which absorb and/or reflect ultraviolet radiation (wavelengths ranging from 120–450 nm), are not suitable for use in low earth orbit (LEO) because of the presence of atomic oxygen which erodes all known organic materials. Therefore, ultraviolet shield materials for use in low earth orbit and exposed to atomic oxygen must be metallic or inorganic in character.

Temperature control of spacecraft and space structures is based on radiation heat transfer through exposed thermal control surfaces since there is no atmosphere to conduct heat. The amount of heat transferred is determined by the surface optical properties: solar absorptance and infrared emittance. By selecting materials and/or coatings with specific optical properties, the designer can control the spacecraft's temperature.

Degradatation, or darkening, of a coating due to ultraviolet radiation can alter the temperature of the space hardware. The change in surface optical properties requires the design to accommodate a broader range of temperatures that the hardware will see in its lifetime. This invariably results in increased radiator size and weight than if a coating had more stable properties. Radiators, in particular, are sized based on the initial optical properties (as fabricated) and the end-of-life optical properties. The increase in solar absorptance from ultraviolet radiation significantly increases the predicted end-of-life solar absorption values which will increase the required radiator size and weight. In addition, the increase in solar absorptance is accompanied by an increase in temperature of the exposed surfaces. A higher temperature can mean that active cooling is required to maintain a desired temperature. Many fuels have restrictions on their maximum allowable temperature. Also, for manned spacecraft, there is a specified maximum temperature such that an astronaut doing work in space will not burn his gloved hand when he/she touches a surface.

In U.S. application Ser. No. 895,667, filed Jun. 9, 1992, titled Protected Optical Coatings, by H. W. Babel et al, and assigned to the same assignee as the present application, there is disclosed application of an organic topcoat such as a polyurethane resin on an inorganic white paint thermal control coating on a metal, e.g. aluminum, substrate, such organic topcoat serving as a protective coat to maintain surface optical properties of the thermal control coating during service in an outer space environment, and provide corrosion protection of the substrate.

However, although such protective organic coatings can be easily applied, usually at ambient temperatures, the intense U.V. radiation encountered in space causes such protective coatings to darken to various degrees. It has proven very difficult to obtain an organic coating that is easily applied and is also sufficiently UV resistant. Thus, normal thermal control surfaces in space have not used protective coatings to shield against ultraviolet radiation.

Accordingly, one object of the invention is to provide protection of ultraviolet sensitive thermal control coatings against degradation from ultraviolet radiation.

Another object is the provision of a protective shield or coating over an ultraviolet sensitive thermal control coating on a substrate, e.g. aluminum, to reduce or eliminate ultraviolet degradation of the thermal control coating.

Still another object is to provide a protective coating of the above type which is strongly adherent to the thermal control coating in space and does not significantly affect the optical properties of the thermal control coating.

Yet another object is to provide a protective coating of the above type over a white paint thermal control coating on an aluminum or aluminum alloy substrate.

Still another object is to provide procedure for application of such protective coating over a thermal control coating on a metal substrate, such as aluminum or an alloy thereof.

Further objects and advantages of the invention will appear hereinafter.

SUMMARY OF THE INVENTION

The above objects are achieved according to the invention by the application of an ultraviolet reflector or absorber topcoat to a thermal control surface to be exposed to ultraviolet radiation.

The purpose of this topcoat is to protect conventional ultraviolet sensitive thermal control coatings on a metal substrate from ultraviolet (UV) degradation. Such thermal control coating can be integral with the metal substrate such as anodized aluminum, or it can be a white thermal control paint coating on the metal substrate. The topcoat is either an ultraviolet reflector or absorber, but is transparent in the visible and infrared wavelengths. Such topcoat is strongly adherent to the thermal control coating and does not significantly affect the optical properties of the thermal control coating and is stable in various space environments. An example of an ultraviolet absorber overcoat is quartz.

Use of the protective topcoat according to the invention will reduce or eliminate the ultraviolet degradation of thermal control coatings, thereby reducing the difference between the beginning-of-life optical properties and the end-of-life optical properties. Furthermore, it will help control the maximum temperatures experienced by a spacecraft surface. This directly affects the design of the hardware, permitting the design and use of a smaller structure. It will also reduce cooling system requirements and ensure meeting the allowable astronaut gloved hand touch temperature.

DETAILED DESCRIPTION OF THE INVENTION AND PREFERRED EMBODIMENTS

The present invention is directed to the application of an ultraviolet protective coating, either in the form of an ultraviolet reflector or ultraviolet absorber topcoat to a sensitive optical thermal control surface on a metal substrate, such as aluminum or an aluminum alloy surface, to protect such thermal control surface against ultraviolet radiation degradation.

The substrates which are coated with the optically sensitive thermal control coating are particularly bare aluminum and its alloys. The alloys commonly used are the 5,000 series of aluminum alloys containing Mg as a primary alloying element, the 7,000 series containing Zn as primary alloying element, the 2,000 series containing Cu as a primarly alloying element and the 6,000 series containing Si and Mg as primary alloying elements. The invention is also applicable to other aluminum alloys, and including clad aluminum alloys. 6061-T6 aluminum is a particularly useful aluminum alloy. While aluminum or its alloys are preferred substrates for minimum weight, other substrates to which the thermal control coating can be applied include, for example, stainless steel and titanium.

One particularly important example of a thermal control surface to be protected from ultraviolet radiation is anodized aluminum, that is, an anodic coating on an aluminum or an aluminum alloy substrate. The anodic coating on the aluminum or aluminum alloy substrate can be applied by any conventional anodizing procedure, for example in an aqueous sulfuric acid electrolyte employing direct current. In carrying out the anodizing procedure, the aluminum or aluminum alloy substrate is generally first cleaned, as in an alkaline solution prior to anodizing, and after anodizing the anodic coating is generally sealed as by treatment in demineralized water at elevated temperature.

Another ultraviolet sensitive thermal control coating which can be protected according to the invention are certain white thermal control paint coatings. A particularly useful material of this type is the material marketed as S13-GLO by the Illinois Institute of Technology Research Institute (ITTRI). This is a white thermal control paint coating comprised of zinc oxide particles encapsulated or coated with potassium silicate, in a low outgassing silicone binder. It is preferred to use this material under conditions of limited ultraviolet exposure.

Another ultraviolet sensitive white thermal control paint coating which can be protected according to the invention is the material marketed as CHEMGLAZE A276 by Lord Chemical Corp. This is a white thermal control coating comprised of titanium dioxide particles in a polyurethane binder.

The thickness of the thermal control coatings can range from about 0.1 to about 10 mils.

An example of a protective ultraviolet absorber coating which can be overcoated on a thermal control coating for ultraviolet protection thereof according to the invention is quartz. An example of a protective ultraviolet reflector coating is aluminum oxide. Both of these materials can be applied as topcoat to the thermal control coating by sputtering the quartz or aluminum oxide onto the thermal control coating.

Other examples of ultraviolet protective overcoats which can be applied for shielding or protecting the thermal control coating are zinc selenide and borosilicate glass, both ultraviolet absorbers.

The thickness of the ultraviolet radiation protective overcoat can range from about 0.01 to about 1.0 mil.

The following are examples of practice of the invention:

EXAMPLE 1

A thin sheet of 6061-T6 aluminum was sulfuric acid anodized. The initial optical properties of the system were an absorptance ($\alpha$) of 0.40 and an infrared emittance ($\epsilon$) of 0.82. To protect its optical properties from ultraviolet degradation, a coating of quartz ($SiO_2$) was sputtered onto the anodized surface. After the addition of the quartz the optical properties were $\alpha=0.41$ and $\epsilon=0.81$. The sample was then exposed to 1000 ESH (equivalent sun hours) of far ultraviolet radiation. The final optical properties were $\alpha=0.42$ and $\epsilon=0.81$. A control sample (exposed to ultraviolet but not coated with quartz) had final optical properties of $\alpha=0.48$ and $\epsilon=0.81$. Because quartz absorbs the far ultraviolet wavelengths, the damaging ultraviolet rays did not degrade the optical properties of the anodized aluminum when exposed to ultraviolet radiation.

EXAMPLE 2

A thin sheet of 2219-T87 aluminum was sulfuric acid anodized. Its initial optical properties were an absorptance ($\alpha$) of 0.46 and an infrared emittance ($\epsilon$) of 0.83. To protect its optical properties from degradation, a coating of quartz was sputtered onto the anodized surface. After the addition of the quartz the optical properties were $\alpha=0.47$ and $\epsilon=0.82$. The sample was then exposed to 1000 ESH of far ultraviolet radiation. The final optical properties were $\alpha=0.48$ and $\epsilon=0.82$. A control sample (exposed to ultraviolet but not coated with quartz) had final optical properties of $\alpha=0.55$ and $\epsilon=0.82$. The damaging ultraviolet rays did not degrade the optical properties of the anodized aluminum when exposed to ultraviolet radiation.

EXAMPLE 3

A thin sheet aluminum was coated with S13-GLO. Its initial optical properties were an absorptace of 0.20 and an infrared emittance of 0.85. To protect its optical properties from degradation, a coating of quartz was sputtered onto the S13-GLO surface. After the addition of the quartz the optical properties were $\alpha=0.22$ and $\epsilon=0.86$. The sample was then exposed to 1000 ESH of far ultraviolet radiation. The final optical properties were $\alpha=0.23$ and $\epsilon=0.85$. A control sample (exposed to ultraviolet but not coated with quartz) had final optical properties of $\alpha=0.30$ and $\epsilon=0.85$ Because quartz absorbs the far ultraviolet wavelengths, the damaging ultraviolet rays did not degrade the optical properties of the S13-GLO when exposed to ultraviolet radiation.

EXAMPLE 4

A thin sheet aluminum was coated with Chemglaze A276. Its initial optical properties were an absorptance of 0.18 and an infrared emittance of 0.86. To protect its optical properties from degradation, a coating of quartz was sputtered onto the A276 surface. After the addition of the quartz the optical properties were $\alpha=0.19$ and $\epsilon=0.85$. The sample was then exposed to 1000 ESH of far ultraviolet radiation. The final optical properties were $\alpha=0.21$ and $\epsilon=0.85$. A control sample (exposed to ultraviolet but not coated with quartz) had final optical propeties of $\alpha=0.29$ and $\epsilon=0.85$. Because quartz absorbs the far ultraviolet wavelengths, the damaging ultraviolet rays did not degrade the optical properties of the A276 when exposed to ultraviolet radiation.

EXAMPLE 5

A thin sheet of 6061-T6 aluminum was sulfuric acid anodized. Its initial optical properties were an absorptance ($\alpha$) of 0.40 and an infrared emittance ($\epsilon$) of 0.82. To protect its optical properties from degradation, a coating of pure aluminum oxide, an ultraviolet reflector, was sputtered onto the anodized surface. After the addition of the aluminum oxide the optical properties were $\alpha=0.41$ and $\epsilon=0.81$. The sample was then exposed to 1000 ESH of far ultraviolet radiation. The final optical properties were $\alpha=0.42$ and $\epsilon=0.81$. A control sample (exposed to ultraviolet but not coated with quartz) had final optical propeties of $\alpha=0.47$ and $\epsilon=0.81$. Because aluminum oxide reflects the ultraviolet wavelengths, the damaging ultraviolet rays did not degrade the optical properties of the anodized aluminum when exposed to ultraviolet radiation.

EXAMPLE 6

A thin sheet of 2219-T87 aluminum was sulfuric acid anodized. Its initial optical properties were an absorptance ($\alpha$) of 0.46 and an infrared emittance ($\epsilon$) of 0.83. To protect its optical properties from degradation, a coating of pure aluminum oxide was sputtered onto the anodized surface. After the addition of the aluminum oxide the optical properties were $\alpha=0.47$ and $\epsilon=0.82$. The sample was then exposed to 1000 ESH of far ultraviolet radiation. The final optical properties were $\alpha=0.48$ and $\epsilon=0.82$. A control sample (exposed to ultraviolet but not coated with aluminum oxide) had final properties of $\alpha=0.55$ and $\epsilon=0.82$. The damaging ultraviolet rays did not degrade the optical properties of the anodized aluminum when exposed to ultraviolet radiation.

EXAMPLE 7

A thin sheet of aluminum was coated with S13-GLO. Its initial optical properties were an absorptance of 0.20 and an infrared emittance of 0.85. To protect its optical properties from degradation, a coating of pure aluminum oxide was sputtered onto the S13-GLO surface. After the addition of the aluminum oxide the optical properties were $\alpha=0.22$ and $\epsilon=0.84$. The sample was then exposed to 1000 ESH of far ultraviolet radiation. The final optical properties were $\alpha=0.23$ and $\epsilon=0.84$. A control sample (exposed to ultraviolet but not coated with aluminum oxide) had final optical properties of $\alpha=0.28$ and $\epsilon=0.84$. Because aluminum oxide reflects the ultraviolet wavelengths, the damaging ultraviolet rays did not degrade the optical properties of the S13-GLO when exposed to ultraviolet radiation.

EXAMPLE 8

A thin sheet of aluminum was coated with Chemglaze A276. Its initial optical properties were an absorptance of 0.18 and an infrared emittance of 0.86. To protect its optical properties from degradation, a coating of pure aluminum oxide was sputtered onto the S13-GLO surface. After the addition of the aluminum oxide the optical properties were $\alpha=0.19$ and $\epsilon=0.85$. The sample was then exposed to 1000 ESH of far ultraviolet radiation. The final optical properties were $\alpha=0.21$ and $\epsilon=0.85$. A control sample (exposed to ultraviolet but not coated with aluminum oxide) had final optical properties of $\alpha=0.29$ and $\epsilon=0.85$. Because aluminum oxide reflects the ultraviolet wavelengths, the damaging ultraviolet rays did not degrade the optical properties of the A276 when exposed to ultraviolet radiation.

From the foregoing, it is seen that the invention provides an efficient ultraviolet protective coating over an ultraviolet sensitive thermal control coating which prevents ultraviolet degradation of the thermal control coating during space service. While the important use of the invention concept is on spacecraft surfaces which require protection from the damage of ultraviolet radiation, the invention concept can have general application where materials require protection from ultraviolet radiation. The novel features of the invention include a topcoat that reflects or absorbs ultraviolet radiation, resulting in little or no change of the underlying thermal control coating, the topcoat is transparent in all wavelengths other than ultraviolet wavelengths (120–450 nm), can be applied by various available commercial processes including sputtering and the topcoat in some instances provides improved durability for the base material or substrate, e.g. aluminum.

Since various changes and modifications of the invention will occur to those skilled in the art within the spirit of the invention, the invention is not to be taken as limited except by the scope of the appended claims.

What is claimed is:

1. A substrate containing an ultraviolet sensitive thermal control coating protected from ultraviolet radiation degradation which comprises an aluminum substrate selected from the group consisting of bare aluminum and an aluminum alloy, an ultraviolet sensitive thermal control coating on said aluminum substrate, said thermal control coating selected from the group consisting of (1) a white coating comprised of zinc oxide particles encapsulated with potassium silicate in a silicone binder, and (2) a white coating comprised of titanium dioxide particles in a polyurethane binder, and an ultraviolet reflector or absorber topcoat on said thermal control coating, comprised of a member selected from the group consisting of quartz, aluminum oxide, zinc selenide and borosilicate glass, the thickness of said thermal control coating ranging from about 0.1 to about 10 mils, and said topcoat having a thickness ranging from about 0.01 to about 1.0 mil.

2. The article of claim 1, said thermal control coating being a white coating comprised of zinc oxide particles encapsulated with potassium silicate in a silicone binder and said ultraviolet reflector or absorber topcoat being quartz.

3. The article of claim 1, said thermal control coating being a white coating comprised of zinc oxide particles encapsulated with potassium silicate, in a silicone binder and said ultraviolet reflector or absorber topcoat being aluminum oxide.

4. The article of claim 1, said thermal control coating being a white thermal control coating comprised of titanium dioxide particles in a polyurethane binder, and said ultraviolet reflector or absorber topcoat being quartz.

5. The article of claim 1, said thermal control coating being a white thermal control coating comprised of titanium dioxide particles in a polyurethane binder, and said ultraviolet reflector or absorber topcoat being aluminum oxide.

6. A process for protecting an ultraviolet sensitive thermal control coating on a metal substrate from ultraviolet radiation degradation, which comprises applying a thermal control coating to an aluminum substrate selected from the group consisting of bare aluminum and an alloy thereof, said thermal control coating selected from the group consisting of (1) a white coating comprised of zinc oxide particles encapsulated with potassium silicate, in a silicone binder, and (2) a white coating comprised of titanium dioxide particles in a polyurethane binder, and applying an ultraviolet reflector or absorber topcoat on said thermal control coating, said ultraviolet reflector or absorber topcoat comprised of a member selected from the group consisting of quartz, aluminum oxide, zinc selenide and borosilicate glass, the thickness of said thermal control coating ranging from about 0.1 to about 10 mils, and said topcoat having a thickness ranging from about 0.01 to about 1.0 mil.

7. The process of claim 6, said thermal control coating being a white coating comprised of zinc oxide particles encapsulated with potassium silicate, in a silicone binder and said ultraviolet reflector or absorber topcoat being quartz.

8. The process of claim 6, said thermal control coating being a white coating comprised of zinc oxide particles encapsulated with potassium silicate, in a silicone binder and said ultraviolet reflector or absorber topcoat being aluminum oxide.

9. The process of claim 6, said thermal control coating being a white coating comprised of titanium dioxide particles in a polyurethane binder and said ultraviolet reflector or absorber topcoat being quartz.

10. The process of claim 6, said thermal control coating being a white thermal control coating comprised of titanium dioxide particles in a polyurethane binder, and said ultraviolet reflector or absorber topcoat being aluminum oxide.

11. A substrate containing an ultraviolet sensitive thermal control coating protected from ultraviolet radiation degradation which comprises an aluminum substrate selected from the group consisting of bare aluminum and an aluminum alloy, an ultraviolet sensitive thermal control coating on said aluminum substrate, said thermal control coating selected from the group consisting of (1) a white coating comprised of zinc oxide particles encapsulated with potassium silicate in a silicone binder, and (2) a white coating comprised of titanium dioxide particles in a polyurethane binder, and a quartz ultraviolet absorber topcoat on said thermal control coating, the thickness of said thermal control coating ranging from about 0.1 to about 10 mils, and said topcoat having a thickness ranging from about 0.01 to about 1.0 mil.

12. A process for protecting an ultraviolet sensitive thermal control coating on a metal substrate from ultraviolet radiation degradation, which comprises applying a thermal control coating to an aluminum substrate selected from the group consisting of bare aluminum and an alloy thereof, said thermal control coating selected from the group consisting of (1) a white coating comprised of zinc oxide particles encapsulated with potassium silicate, in a silicone binder, and (2) a white coating comprised of titanium dioxide particles in a polyurethane binder, and applying a quartz ultraviolet absorber topcoat to said thermal control coating, the thickness of said thermal control coating ranging from about 0.1 to about 10 mils, and said topcoat having a thickness ranging from about 0.01 to about 1.0 mil.

* * * * *